(12) United States Patent
Bernard

(10) Patent No.: US 9,429,116 B2
(45) Date of Patent: Aug. 30, 2016

(54) MAPPED SOUND GENERATOR

(75) Inventor: Benjamin Bernard, Oxford (GB)

(73) Assignee: McLaren Automotive Limited, Surrey (GB)

( * ) Notice: Subject to any disclaimer, the term of this patent is extended or adjusted under 35 U.S.C. 154(b) by 163 days.

(21) Appl. No.: 13/635,380

(22) PCT Filed: Mar. 17, 2011

(86) PCT No.: PCT/EP2011/054080
§ 371 (c)(1),
(2), (4) Date: Nov. 28, 2012

(87) PCT Pub. No.: WO2011/113910
PCT Pub. Date: Sep. 22, 2011

(65) Prior Publication Data
US 2013/0199487 A1 Aug. 8, 2013

(30) Foreign Application Priority Data
Mar. 17, 2010 (GB) .................................. 1004447.7

(51) Int. Cl.
*F02M 35/104* (2006.01)
*G10K 15/04* (2006.01)
(Continued)

(52) U.S. Cl.
CPC ........ *F02M 35/1294* (2013.01); *F02B 27/001* (2013.01); *F02M 35/104* (2013.01);
(Continued)

(58) Field of Classification Search
CPC .............. F02M 35/12; F02M 35/104; F02M 35/1294; F02M 35/1227; F02M 35/1222; F02M 35/125; G10K 11/22; G10K 15/02; F02B 77/13; F02B 27/001
USPC ........................................ 123/184.53, 184.57
See application file for complete search history.

(56) References Cited

U.S. PATENT DOCUMENTS 7,188,703 B2 * 3/2007 Hofmann et al. ............ 181/271
7,353,791 B2 * 4/2008 Sasaki et al. ............ 123/184.57
(Continued)

FOREIGN PATENT DOCUMENTS

DE  42 33 252 C1  12/1993
DE  196 00 515 A1  7/1996
(Continued)

OTHER PUBLICATIONS

Translation of Detailed Description, DE4233252(C1), Quang-Hue, translation obtained from http://worldwide.espacenet.com/, pp. 1-3.*
(Continued)

*Primary Examiner* — Grant Moubry
(74) *Attorney, Agent, or Firm* — Vista IP Law Group, LLP

(57) ABSTRACT

An intake sound generator for an internal combustion engine of a vehicle, the internal combustion engine having an intake manifold for distributing a combustion mixture to a plurality of cylinders of the engine, and an engine throttle controlled by an electronic engine management system for regulating the flow of the combustion mixture into the intake manifold, the engine management system being coupled to an engine throttle lever whose position indicates the engine throttle position desired by a driver of the vehicle, and the intake sound generator comprising: a sound outlet port at an intake manifold; a first sound transmission tube connected to the sound outlet port and adapted to conduct engine-generated sound pulses from the intake manifold; sound receiving means coupled to the first sound transmission tube and operable to receive engine-generated sound pulses conducting along the first sound transmission tube; a sound throttle connected along the first sound transmission tube at a point intermediate between the sound receiving means and the sound outlet port, the sound throttle being operable to regulate engine-generated sound pulses conducted along the first sound transmission tube; and sound providing means operable to provide engine-generated sound pulses received at the sound receiving means into a vehicle cabin; wherein the intake sound generator is configured such that the sound throttle position varies in dependence on the position of the engine throttle lever and is independent of the engine throttle position.

21 Claims, 3 Drawing Sheets

(51) Int. Cl.
  *F02M 35/12* (2006.01)
  *F02B 27/00* (2006.01)
  *G10K 15/02* (2006.01)
(52) U.S. Cl.
  CPC ....... *F02M35/125* (2013.01); *F02M 35/1222* (2013.01); *F02M 35/1227* (2013.01); *G10K 15/02* (2013.01); *Y02T 10/146* (2013.01)

(56) References Cited

U.S. PATENT DOCUMENTS

| | | | |
|---|---|---|---|
| 7,464,788 B2 * | 12/2008 | Alex et al. | 181/250 |
| 7,487,755 B2 * | 2/2009 | Harada | 123/184.57 |
| 7,621,370 B2 * | 11/2009 | Abe | F02M 35/10137 123/184.57 |
| 7,845,466 B2 * | 12/2010 | Kostun et al. | 181/271 |
| RE42,490 E * | 6/2011 | Takeuchi et al. | 181/271 |
| 7,975,802 B2 * | 7/2011 | Yokoya et al. | 181/160 |
| 8,325,932 B2 * | 12/2012 | Maeda | 381/61 |
| 2002/0157897 A1 | 10/2002 | Hofmann et al. | |
| 2006/0060419 A1 * | 3/2006 | Alex et al. | 181/250 |
| 2006/0283658 A1 * | 12/2006 | Abe et al. | 181/204 |
| 2007/0044747 A1 * | 3/2007 | Sawatari et al. | 123/184.21 |
| 2007/0292281 A1 * | 12/2007 | Sasaki et al. | 417/269 |
| 2007/0295553 A1 * | 12/2007 | Ochi et al. | 181/18 |

FOREIGN PATENT DOCUMENTS

| | | |
|---|---|---|
| DE | 102 12 257 A1 | 9/2002 |
| DE | 20 2007 015940 U1 | 3/2009 |
| WO | WO 03/101780 A1 | 12/2003 |

OTHER PUBLICATIONS

International Search Report dated May 23, 2011 for PCT Appln. No. PCT/EP2011/054080, 3 pages.

* cited by examiner

MAPPED SOUND GENERATOR

BACKGROUND OF THE INVENTION

This invention relates to an intake sound generator for a vehicle engine.

In most automobiles, there is a general desire to reduce the levels of noise in the vehicle cabin, which can be distracting or tiring for the driver and other occupants. Sources of noise include road noise generated between the tyres and the road, wind noise generated by the movement of the automobile through the air, and engine noise generated by the engine and its associated moving parts. The sound level of these sources of noise in the cabin of an automobile can be lowered through the use of soundproofing and isolating materials between the components of the cabin and the vehicle chassis.

However, there are occasions when a driver will want better aural feedback from the engine whilst maintaining low levels of road and wind noise. For example, on a track the driver of a sports car looking to push the car to its limits of performance will want as much feedback as possible, including aural feedback from the engine. This helps the driver to, amongst other things, optimally time gear changes. If the noise levels in the cabin of the sports car have been overly reduced through the use of soundproofing, the aural feedback received by the driver can be significantly diminished.

In order to address this problem and to improve the acoustic feedback from turbocharged and supercharged engines, intake sound generators have been proposed such as the Mann+Hummel Symposer™. The Symposer is essentially an arrangement of diaphragms and tubes which transfers engine-generated pulsations directly into the passenger compartment. A Symposer is connected directly before an engine throttle on the intake path of an engine so as to accurately pick up the variations in engine charge and convey these to the driver. This can help to overcome the acoustic dampening effect of the compression developed by turbochargers and superchargers in an air intake system and more generally helps useful acoustic components generated at an engine to bypass any soundproofing in the vehicle.

However, with most automobiles now having sophisticated electronic engine management systems, the position of an engine throttle depends on many different factors and can seem to be removed from the accelerations and decelerations of the vehicle intended by the driver. As a result, the feedback received by a driver from a Symposer can be confusing and unhelpful.

There is therefore a need for an improved intake sound generator for providing aural feedback to a driver.

SUMMARY OF THE INVENTION

According to a first aspect of the present invention there is provided an intake sound generator for an internal combustion engine of a vehicle, the internal combustion engine having an intake manifold for distributing a combustion mixture to a plurality of cylinders of the engine, and an engine throttle controlled by an electronic engine management system for regulating the flow of the combustion mixture into the intake manifold, the engine management system being coupled to an engine throttle lever whose position indicates the engine throttle position desired by a driver of the vehicle, and the intake sound generator comprising: a sound outlet port at an intake manifold; a first sound transmission tube connected to the sound outlet port and adapted to conduct engine-generated sound pulses from the intake manifold; sound receiving means coupled to the first sound transmission tube and operable to receive engine-generated sound pulses conducting along the first sound transmission tube; a sound throttle connected along the first sound transmission tube at a point intermediate between the sound receiving means and the sound outlet port, the sound throttle being operable to regulate engine-generated sound pulses conducted along the first sound transmission tube; and sound providing means operable to provide engine-generated sound pulses received at the sound receiving means into a vehicle cabin; wherein the intake sound generator is configured such that the sound throttle position varies in dependence on the position of the engine throttle lever and is independent of the engine throttle position.

Preferably the sound receiving means comprises a flexible diaphragm housed in a chamber connected to the first sound transmission tube, the flexible diaphragm being connected across the chamber and configured such that, in response to engine-generated sound pulses being conducted along the first sound transmission tube into the chamber, the flexible diaphragm vibrates so as to transmit the engine-generated sound pulses across the diaphragm from a first side of the chamber at which the first sound transmission tube is connected to a second side of the chamber; and the sound providing means comprises a second sound transmission tube for connection between the second side of the chamber and the vehicle cabin, the second sound transmission tube being operable to, when connected between the second side of the chamber and a vehicle cabin, conduct engine-generated sound pulses at the second side of the chamber into the vehicle cabin.

Preferably the flexible diaphragm is configured to prevent the flow of combustion mixture from the first sound transmission tube into the second sound transmission tube.

Alternatively the sound receiving means is a microphone and the sound providing means is a speaker.

Preferably, beyond a predetermined position of the engine throttle lever, the sound throttle position varies monotonically with the position of the engine throttle lever such that the sound throttle position is more open when the position of the engine throttle lever indicates that a fully open engine throttle position is desired than when the position of the engine throttle lever indicates a less open engine throttle position is desired.

Preferably, up to the predetermined position of the engine throttle lever, the sound throttle is closed so as to seal off the diaphragm from the intake manifold.

Preferably the sound throttle position varies monotonically with the speed of the engine such that the openness of the sound throttle increases as the engine speed increases.

Preferably the intake sound generator is operable in any one of a plurality of modes, each mode determining one or more of:
  the rate of change of the sound throttle position with respect to the position of the engine throttle lever;
  the rate of change of the sound throttle position with respect to the engine speed; and
  said predetermined position of the engine throttle lever.

Preferably in a first mode the sound throttle is closed over most of the range of movement of the engine throttle lever and in a second mode the sound throttle is at least partially open over most of the range of movement of the engine throttle lever.

The intake sound generator can further comprise a sound management unit configured to control the sound throttle in accordance with a selected one of a plurality of predetermined engine sound maps, each engine sound map defining the variation of sound throttle position with engine throttle lever position and engine speed.

Preferably the sound management unit is configured to select a predetermined engine sound map in dependence on the mode of the intake sound generator. Suitably the sound management unit forms part of the electronic engine management system.

Preferably the sound throttle is a butterfly valve or other aperture of adjustable size.

According to a second aspect of the present invention there is provided an intake sound generator and an intake manifold as claimed in any preceding claim. Preferably the intake manifold forms part of a forced induction system comprising one or more turbochargers or superchargers configured to compress the combustion mixture prior to the combustion mixture entering the intake manifold. Preferably the sound outlet port of the intake sound generator is connected into the intake manifold at one end of the intake manifold close to those parts of the intake manifold arranged to distribute a combustion mixture to the end cylinders of the engine.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to an intake sound generator for an internal combustion engine of a vehicle, and in particular an automobile. An internal combustion engine to which the principles described herein apply is not limited in its configuration or fuel type, and could be a straight, flat or V-engine having any number of cylinders and running on any fuel, including petrol, diesel and ethanol.

Figure 1:
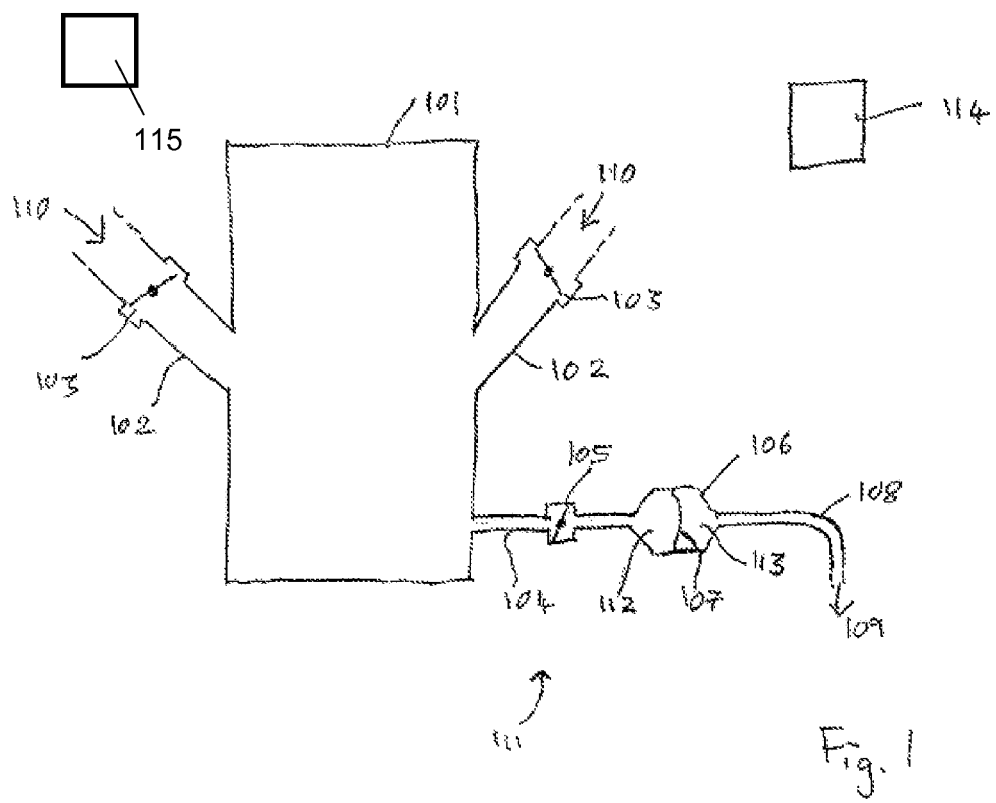
FIG. 1 is a schematic drawing of an intake sound generator configured in accordance with the present invention.

An intake sound generator configured in accordance with the present invention is shown in FIG. 1. The figure shows an intake manifold 101 for an internal combustion engine (the engine is not shown) which is fed a combustion mixture by a pair of intake ports 102 which do not form part of the intake manifold. An intake manifold essentially comprises a plenum configured so as to ensure that the fuel of the combustion mixture is well atomised and evenly mixed with air. Each intake port includes a throttle 103 configured to regulate the flow of the combustion mixture (indicated by arrow 110) into the intake manifold. In general there may be one or more intake ports and throttles. The throttles 103 are controlled by an electronic engine management system (not shown) for regulating the flow of the combustion mixture into the intake manifold. The intake manifold is configured to evenly distribute the combustion mixture (which is generally a mix of fuel and air) to the cylinders of the engine.

The intake sound generator 111 comprises an input tube 104 connected to the intake manifold and configured to conduct sound pulses generated by the engine along its length to means for receiving the sound pulses, which could be a microphone 501, but is preferably a flexible diaphragm 107 housed within a chamber 106 (as shown in the figure). It is advantageous if the input tube is connected into the plenum of the intake manifold close to that part of the intake manifold which feeds the one or more cylinders at the end of the bank of cylinders fed by the intake manifold. This can help to ensure that the intake sound generator receives a rich engine sound which is not overly harsh and provides effective driver feedback. For example, for a V8 engine the input tube would preferably be connected at the end of the intake manifold close to cylinders 1, 4, 5 or 8 (with the cylinders being numbered in one direction from one end of the engine block). Flexible diaphragm 107 is connected across the diameter of the chamber such that sound pulses travelling down the input tube into the chamber drive the motion of the diaphragm. Chamber 106 preferably has a cross-section of greater diameter than intake tube 104.

In other words, the diaphragm moves in response to changes in pressure generated by the engine in the intake manifold. Because the diaphragm is configured to move in accordance with sound pulses received from the engine, the variations in pressure on side 112 of the chamber to which the input tube is connected are transferred into side 113 of the chamber to which an output tube 108 is connected. Sound pulses travelling down the input tube can therefore pass through the diaphragm (and hence the chamber) and into output tube 108. The end of output tube 108 remote from chamber 106 (which may terminate in a second chamber housing a second diaphragm) is connected into the cabin of the vehicle which is powered by the engine. This is indicated by arrow 109. Sound pulses created by the engine in the intake manifold are therefore provided by the output tube (and optionally the second diaphragm arrangement) into the cabin. In the example shown in FIG. 1, sound pulses are mechanically transmitted into the cabin by means of the ISG. If the means for receiving the sound pulses were a microphone 501 and a speaker 502 arranged to provide the engine sound pulses received at the microphone 501 into the cabin, then the sound pulses would be electronically transmitted from between the microphone 501 and speaker 502.

Because the intake sound generator (ISG) is connected to the intake manifold after the throttles on intake path 110, the ISG can gather sound from all cylinders of the engine. This improves the quality of the engine sounds transmitted into the cabin by the ISG and ensures that the true acoustic characteristics of the engine are provided to the driver. Furthermore, by connecting the input tube to the intake manifold, the pressure variations picked up by the ISG are less influenced by the engine throttles which are electronically managed by the engine management system and do not therefore have a direct relationship to the driver's controls.

The connection of the ISG to the intake manifold is particularly advantageous in an engine having one or more turbochargers or superchargers (collectively, 115). Turbochargers and superchargers 115 compress the combustion mixture so as to increase the density of air entering the engine and hence the maximum power output of the engine. However, such forced-induction systems can muffle the natural sound of an engine as a result of the exhaust gases being re-routed. By connecting the ISG at the intake manifold, on the high pressure side of the intake system (i.e. after compression of the combustion mixture by the turbocharger or supercharger 115) the more natural engine sounds generated in the intake manifold can be supplied into the cabin. Thus, an ISG configured as described herein can help emphasize the natural sounds of a forced-induction engine to the driver, and hence providing improved feedback.

Since the flow of the combustion mixture in an intake manifold is substantially chaotic in order to achieve good fuel atomisation and distribution of the combustion mixture between the cylinders, the precise placement of input tube 104 at the intake manifold must generally be individually determined for each engine and intake manifold design by means of trial and error, until the desired engine tone is achieved. Similarly, the length, arrangement and material composition of the input and output tubes are preferably selected so that the most desirable acoustic characteristics of the engine (which provide useful feedback to the driver or pleasing engine notes) are emphasized and delivered into the passenger compartment.

The intake sound generator 111 further comprises a sound throttle 105 located along the input tube between the intake manifold and chamber 106. The sound throttle is operable to regulate the sound level at the diaphragm of the pressure pulses generated by the engine in the intake manifold. This allows the level of the acoustic feedback from the engine into the cabin to be controlled. The sound throttle is most straightforwardly a component defining an aperture of adjustable size, such as a butterfly valve. The sound throttle is controlled by a sound management unit 114, which could form part of the electronic engine management system. By locating the sound throttle between the intake manifold and the diaphragm, when the sound throttle is closed or partly closed it can protect the diaphragm from excessive pressure fluctuations in the intake manifold, or the high pressures generated in a forced-induction engine.

In modern automobile engines, the engine throttle is controlled by an electronic engine management system and is not linked directly to an engine throttle lever controlled by the driver, such as an accelerator pedal. The position of the engine throttle does not therefore directly depend on the position of the engine throttle lever, with the engine management system determining the position of the engine throttle in dependence on inputs from many different sensors including: traction control, fuel consumption, engine speed, and engine temperature sensors. An engine throttle lever instead indicates to the engine management system the position of the engine throttle which is desired by the driver. Thus the position of the engine throttle roughly correlates to the position of the engine throttle lever but at any given moment the engine throttle may be in a different position to that indicated by the position of the engine throttle lever, as dictated by the engine management system.

Intake sound generator 111 is configured such that the position of sound throttle 105 (i.e. its openness) varies in dependence on the position of the engine throttle lever controlled by the driver and is independent of the position of the engine throttle determined by the engine management system. This significantly improves the feedback received by the driver from the engine because the volume of the engine in the cabin then varies with the position of the engine throttle lever—i.e. broadly speaking, if the driver further depresses the accelerator pedal the sound level of the engine noise increases and if the driver releases the accelerator pedal the sound level of the engine noise decreases. Intake sound generator 111 thus provides more natural feedback than has been the case with prior intake sound generators.

Figure 2:
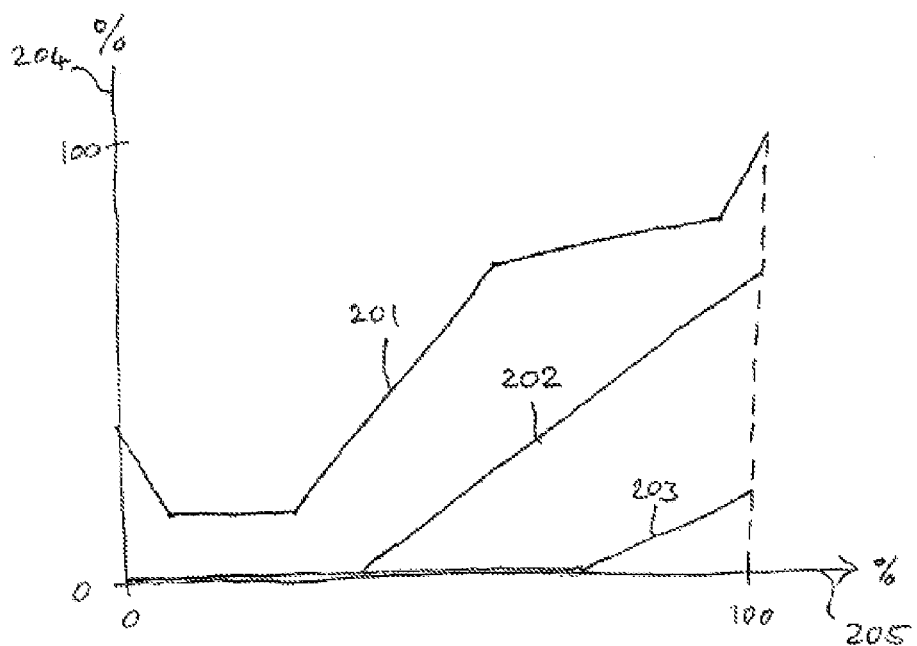
FIG. 2 is a plot illustrating the variation of sound throttle position with accelerator pedal position in three different modes.

Examples of the variation of the position of the sound throttle with the position of the engine throttle lever are shown in FIG. 2. Axis 204 corresponds to the openness of the sound throttle in percent between 0% (fully closed) and 100% (fully open). Note that when sound throttle 105 is in its fully closed position it may not necessarily seal off chamber 106 from the intake manifold, although this is preferred. Axis 205 corresponds to the degree of depression of the engine throttle lever from 0% (the lever is not depressed) to 100% (the lever is fully depressed).

Each of the curves 201, 202 and 203 illustrates an exemplary variation of the sound throttle position with engine throttle lever position. ISG 111 could be configured to operate in accordance with any particular one of these curves. However, it is advantageous if the ISG is configured to provide a plurality of predetermined modes, each mode being described by a different curve of sound throttle position with engine throttle lever position. For example, the ISG could offer different modes for different driving styles, with the sound throttle generally being more open in the modes corresponding to more aggressive driving styles.

In FIG. 2, the three exemplary curves 201, 202 and 203 describe three different variations of sound throttle position with engine throttle lever position, with curve 201 being a "track mode" for an aggressive driving style as might be adopted on a race track, curve 203 being a "normal mode" for everyday town and motorway driving, and curve 202 being a "sport mode" for an intermediate driving style. In normal mode (curve 203), it can be seen that the sound throttle is fully closed over most of the range of travel of the engine throttle lever position, with the sound throttle only opening when the lever is around 70% depressed—i.e. under hard accelerations. When the lever is fully depressed the sound throttle is only 20% open. In sport mode (curve 202), the lever position at which the sound throttle opens is at around 40% and the rate at which the sound throttle opens is steeper than in normal mode. When the lever is fully depressed the sound throttle is 60% open.

In track mode (curve 201), the sound throttle is open to a varying degree at all positions of the engine throttle lever, the rate at which the sound throttle opens is generally steeper than in sport mode, and when the lever is fully depressed the sound throttle is 100% open. In track mode it can also be beneficial to have the sound throttle relatively more open over very small depressions of the engine throttle lever. This provides improved aural feedback from the engine under braking, when the accelerator pedal (the engine throttle lever) is not depressed. However, note that it can still be said for curve 201 that the sound throttle position increases generally monotonically with engine throttle lever position.

It is also advantageous if the position of sound throttle 105 is further configured to vary in dependence on the speed of the engine. At lower revolutions per minute (RPM), such as during town driving or at idle, high volume engine sounds are likely to be unnecessary and unwanted. At a higher RPM, such as when driving aggressively on a track, high volume engine sounds are more appropriate and likely to provide useful feedback to the driver. Most preferably the position of the sound throttle is configured to vary monotonically with engine speed such that the position of the sound throttle generally becomes more open as the engine speed increases. In other words, for a given increase in engine speed the openness of the sound throttle either increases or stays the same, but does not decrease.

Figure 3:
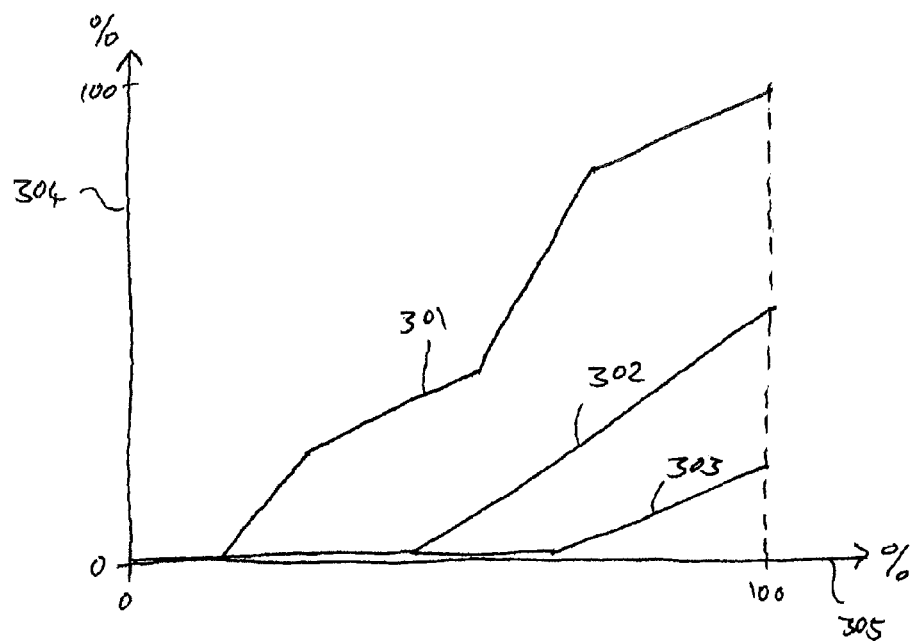
FIG. 3 is a plot illustrating the variation of sound throttle position with engine speed in three different modes.

Examples of the variation of the position of the sound throttle with engine speed are shown in FIG. 3. Axis 304 corresponds to the openness of the sound throttle in percent between 0% (fully closed) and 100% (fully open). Axis 305 corresponds to the percentage of the maximum RPM of the engine from 0% (engine idle) to 100% (maximum RPM). The figure shows three different exemplary curves 301, 302 and 303 describing three different variations in sound throttle position with engine speed, with curve 301 corresponding to a "track mode" for an aggressive driving style as might be adopted on a race track, curve 303 being a "normal mode" for everyday town and motorway driving, and curve 302 being a "sport mode" for an intermediate driving style. These modes could correspond to the three modes illustrated in FIG. 2.

In normal mode (curve 303), it can be seen that the sound throttle is fully closed over most of the range of the engine speed, with the sound throttle only opening when the engine speed reaches around 60% of the maximum engine RPM. At maximum RPM in this mode the sound throttle is only 20% open. In sport mode (curve 302), the engine speed at which the sound throttle opens is at around 40% of the its maximum RPM and the rate at which the sound throttle opens is steeper than in normal mode. At maximum RPM in this mode the sound throttle is 60% open. In track mode (curve 301), the sound throttle opens at around 20% of the maximum engine RPM and the rate at which the sound throttle opens is generally steeper than in sport mode. When the engine speed is at its maximum the sound throttle is 100% open.

The ISG could be configured to operate in accordance with any particular one of curves 301, 302 and 303. However, it is advantageous if the ISG has a set of predetermined selectable modes suitable for a range of different driving conditions, each providing a different variation of acoustic feedback with engine speed. The driver can be provided with a mode selector for switching between the ISG modes, which could be a button, a dial or an option presented in an electronic interface. Alternatively or additionally, the modes could be automatically selected by an electronic vehicle management system—for example, the ISG behaviour could be modified in dependence on whether or not one or more windows of the vehicle are open, or if a satellite navigation system provided in the vehicle determines that the vehicle is on a motorway or in a town.

In the most preferred embodiment, the ISG is capable of operating in accordance with any one of a set of predetermined "engine sound maps", each of which defines the sound throttle position as a function of both engine throttle lever position and engine speed in a given ISG mode. These engine sound maps could be stored at the engine management system, which is preferably configured to control sound throttle 105 in accordance with the stored engine sound map for the selected ISG mode. A typical engine management system can be readily modified to perform these functions as it will already receive the engine throttle position and engine speed information. Alternatively, the ISG could store the engine sound maps and perform control of sound throttle 105.

The ISG modes could be linked to other modes of the car—for example, a sports car will often have various modes defining suspension settings, engine timings and the aggressiveness of gear shifts in an automatic or semi-automatic gearbox. Thus, a single "track mode" could be provided for a vehicle configured in accordance with the present invention, the track mode defining an aggressive set of engine timings, firm suspension settings, fast gearshifts and an engine sound map defining the sound throttle position as a function of engine throttle lever position and engine speed in accordance with curves 201 and 301.

Figure 4:
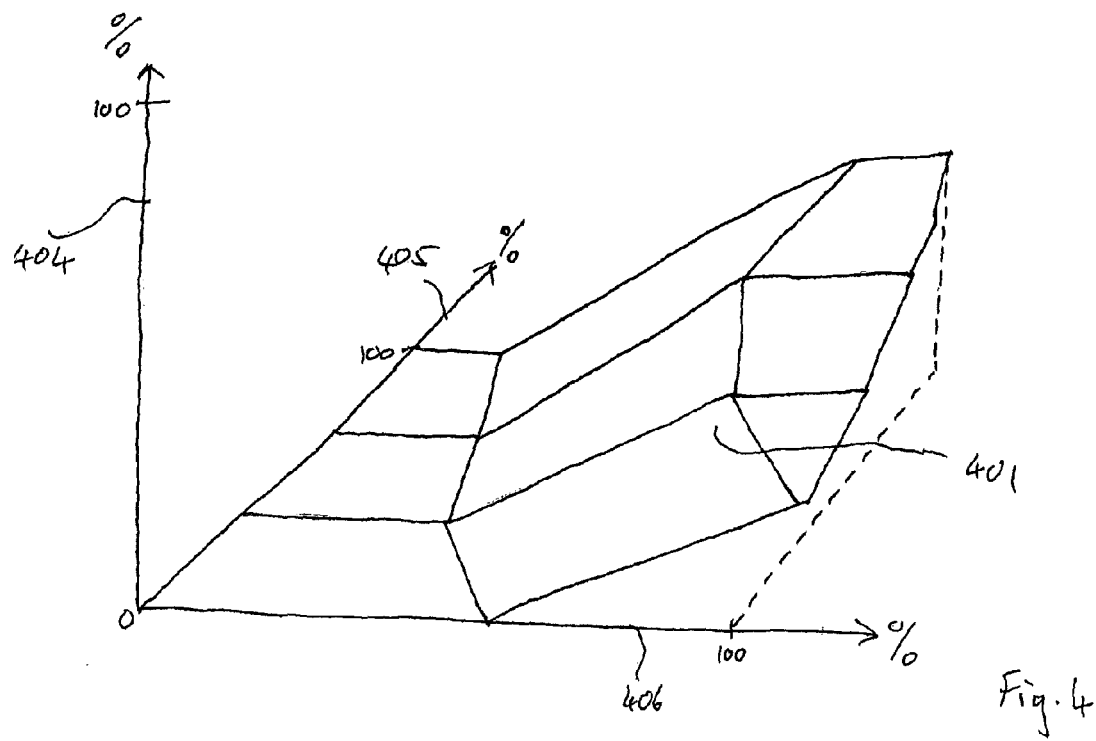
FIG. 4 is a rough three-dimensional plot illustrating the variation of sound throttle position with both accelerator pedal position and engine speed in a particular mode.
Figure 5:
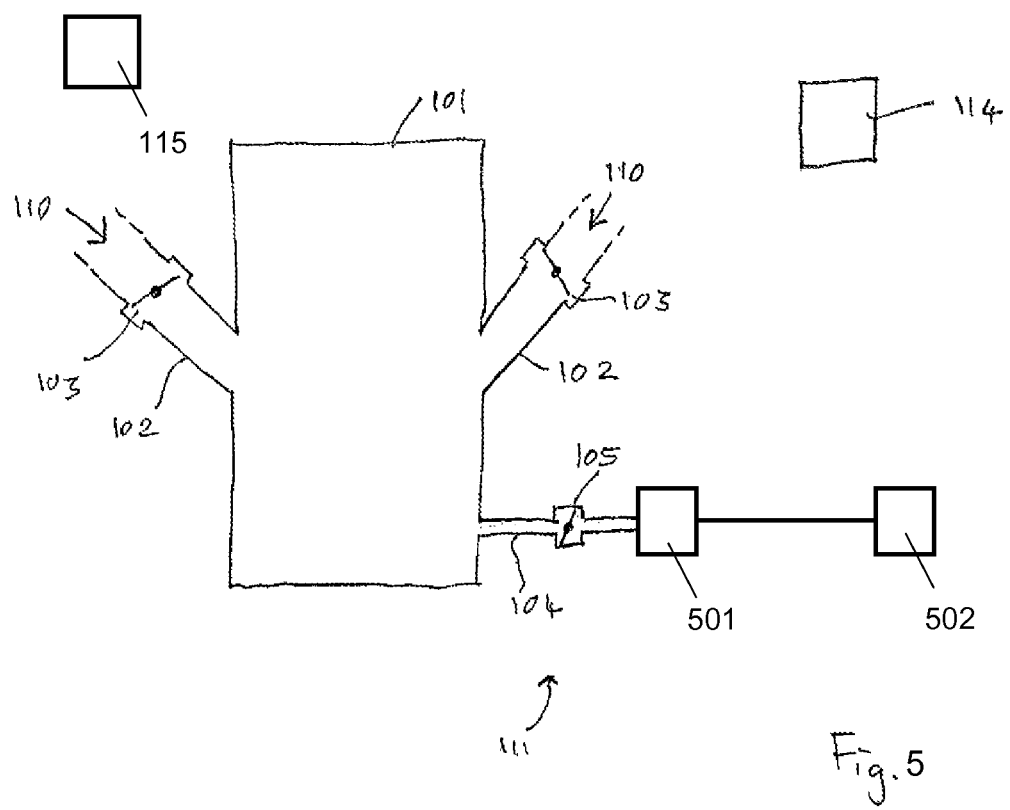
FIG. 5 is a schematic diagram of an intake sound generator configured in accordance with the present invention.

An exemplary engine sound map is shown in FIG. 4 which is a three-dimensional plot showing the variation of sound throttle position (axis 404) with engine speed (axis 405) and engine throttle position (axis 406). The plot surface 401 roughly correlates with the "sport mode" curves shown in FIGS. 2 and 3. The sound throttle position for any combination of engine throttle lever position and engine speed can be determined from the corresponding point on surface 401. Surface 401 therefore represents a function of engine throttle lever position and engine speed.

Surface 401 can be thought of as being built up by combining two-dimensional plots of sound throttle position versus engine throttle lever position for each of a plurality of different engine speeds; equally the surface can be thought of as being built up by combining two-dimensional plots of sound throttle position versus engine speed for each of a plurality of different engine throttle lever positions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An intake sound generator for an internal combustion engine of a vehicle, the internal combustion engine having an intake manifold for distributing a combustion mixture to a plurality of cylinders of the engine, and an engine throttle controlled by an electronic engine management system for regulating a flow of the combustion mixture into the intake manifold, the engine management system being coupled to an engine throttle lever whose position indicates an engine throttle position desired by a driver of the vehicle, and the intake sound generator comprising:

a sound outlet port at an intake manifold, the intake manifold being for distributing the combustion mixture to the plurality of cylinders of the engine and the flow of the combustion mixture into the intake manifold being regulated by the engine throttle;

a first sound transmission tube connected to the sound outlet port and adapted to conduct engine-generated sound pulses from the intake manifold;

sound receiving means coupled to the first sound transmission tube and operable to receive engine-generated sound pulses conducting along the first sound transmission tube;

a sound throttle connected along the first sound transmission tube at a point intermediate between the sound receiving means and the sound outlet port, the sound throttle being operable to regulate engine-generated sound pulses conducted along the first sound transmission tube;

sound providing means operable to provide engine-generated sound pulses received at the sound receiving means into a vehicle cabin; and a sound management unit configured to control the sound throttle such that the sound throttle position varies as a function of both: i) a position of the engine throttle lever; and ii) a speed of the engine, and is independent of the engine throttle position.

2. The intake sound generator as claimed in claim 1, wherein:

the sound receiving means comprises a flexible diaphragm housed in a chamber connected to the first sound transmission tube, the flexible diaphragm being connected across the chamber and configured such that, in response to engine-generated sound pulses being conducted along the first sound transmission tube into the chamber, the flexible diaphragm vibrates so as to transmit the engine-generated sound pulses across the diaphragm from a first side of the chamber at which the first sound transmission tube is connected to a second side of the chamber; and the sound providing means comprises a second sound transmission tube for connection between the second side of the chamber and the vehicle cabin, the second sound transmission tube being operable to, when connected between the second side of the chamber and the vehicle cabin, conduct engine-generated sound pulses at the second side of the chamber into the vehicle cabin.

3. The intake sound generator as claimed in claim 2, wherein the flexible diaphragm is configured to prevent the flow of combustion mixture from the first sound transmission tube into the second sound transmission tube.

4. The intake sound generator as claimed in claim 2, wherein the sound management unit is configured to control the sound throttle such that, beyond a predetermined position of the engine throttle lever, the sound throttle position varies monotonically with the position of the engine throttle lever such that the sound throttle position is more open when the position of the engine throttle lever indicates that a fully open engine throttle position is desired than when the position of the engine throttle lever indicates that a less open engine throttle position is desired.

5. The intake sound generator as claimed in claim 4, wherein the sound management unit is configured to control the sound throttle such that, up to the predetermined position of the engine throttle lever, the sound throttle is closed so as to seal off the diaphragm from the intake manifold.

6. The intake sound generator as claimed in claim 4, wherein the sound management unit is configured to control the sound throttle such that the sound throttle position varies monotonically with the engine speed such that an openness of the sound throttle increases as the engine speed increases; and wherein the intake sound generator is operable in any one of a plurality of modes, each mode determining one or more of:

a rate of change of the sound throttle position with respect to the position of the engine throttle lever;

a rate of change of the sound throttle position with respect to the engine speed; and said predetermined position of the engine throttle lever.

7. The intake sound generator as claimed in claim 6, wherein the sound management unit is configured to control the sound throttle such that in a first mode the sound throttle is closed over most of a range of movement of the engine throttle lever and in a second mode the sound throttle is at least partially open over most of the range of movement of the engine throttle lever.

8. The intake sound generator as claimed in claim 6, wherein the sound management unit is configured to control the sound throttle in accordance with a selected one of a plurality of predetermined engine sound maps, each engine sound map defining the variation of sound throttle position with engine throttle lever position and engine speed; and wherein the sound management unit is configured to select a predetermined engine sound map in dependence on the mode of the intake sound generator.

9. The intake sound generator as claimed in claim 1, wherein the sound receiving means is a microphone and the sound providing means is a speaker.

10. The intake sound generator as claimed in claim 1, wherein the sound management unit is configured to control the sound throttle such that, beyond a predetermined position of the engine throttle lever, the sound throttle position varies monotonically with the position of the engine throttle lever such that the sound throttle position is more open when the position of the engine throttle lever indicates that a fully open engine throttle position is desired than when the position of the engine throttle lever indicates that a less open engine throttle position is desired.

11. The intake sound generator as claimed in claim 10, wherein the sound management unit is configured to control the sound throttle such that the sound throttle position varies monotonically with the engine speed such that the openness of the sound throttle increases as the engine speed increases; and wherein the intake sound generator is operable in any one of a plurality of modes, each mode determining one or more of:

a rate of change of the sound throttle position with respect to the position of the engine throttle lever;

a rate of change of the sound throttle position with respect to the engine speed; and said predetermined position of the engine throttle lever.

12. The intake sound generator as claimed in claim 11, wherein the sound management unit is configured to control the sound throttle such that in a first mode the sound throttle is closed over most of a range of movement of the engine throttle lever and in a second mode the sound throttle is at least partially open over most of the range of movement of the engine throttle lever.

13. The intake sound generator as claimed in claim 11, wherein the sound management unit is configured to control the sound throttle in accordance with a selected one of a plurality of predetermined engine sound maps, each engine sound map defining a variation of sound throttle position with engine throttle lever position and engine speed; and wherein the sound management unit is configured to select a predetermined engine sound map in dependence on a mode of the intake sound generator.

14. The intake sound generator as claimed in claim 1, wherein the sound management unit is configured to control the sound throttle such that the sound throttle position varies monotonically with the engine speed such that an openness of the sound throttle increases as the engine speed increases.

15. The intake sound generator as claimed in claim 1, wherein the sound management unit is configured to control the sound throttle in accordance with a selected one of a plurality of predetermined engine sound maps, each engine sound map defining a variation of sound throttle position with engine throttle lever position and engine speed.

16. The intake sound generator as claimed in claim 15, wherein the sound management unit forms part of the electronic engine management system.

17. The intake sound generator as claimed in claim 1, wherein the sound throttle is a butterfly valve or other aperture of adjustable size.

18. The intake sound generator as claimed in claim 1, wherein the sound management unit is configured to determine a sound throttle position in dependence on engine throttle lever position for a plurality of different engine speeds, and to determine the sound throttle position in dependence on engine speed for a plurality of different engine throttle lever positions.

19. An intake sound generator and intake manifold, the intake sound generator being for an internal combustion engine of a vehicle and the intake manifold being for distributing a combustion mixture to a plurality of cylinders of the engine, and the internal combustion engine having an engine throttle controlled by an electronic engine management system for regulating a flow of the combustion mixture into the intake manifold, the engine management system being coupled to an engine throttle lever whose position indicates a engine throttle position desired by a driver of the vehicle, and the intake sound generator comprising:
- a sound outlet port at the intake manifold, the intake manifold being for distributing the combustion mixture to the plurality of cylinders of the engine and the flow of the combustion mixture into the intake manifold being regulated by the engine throttle;
- a first sound transmission tube connected to the sound outlet port and adapted to conduct engine-generated sound pulses from the intake manifold;
- sound receiving means coupled to the first sound transmission tube and operable to receive engine-generated sound pulses conducting along the first sound transmission tube;
- a sound throttle connected along the first sound transmission tube at a point intermediate between the sound receiving means and the sound outlet port, the sound throttle being operable to regulate engine-generated sound pulses conducted along the first sound transmission tube;
- sound providing means operable to provide engine-generated sound pulses received at the sound receiving means into a vehicle cabin; and
- a sound management unit configured to control the sound throttle such that the sound throttle position varies as a function of both: i) a position of the engine throttle lever; and ii) a speed of the engine, and is independent of the engine throttle position.

20. The intake sound generator and intake manifold as claimed in claim 19, wherein the intake manifold forms part of a forced induction system comprising one or more turbochargers or superchargers configured to compress the combustion mixture prior to the combustion mixture entering the intake manifold.

21. The intake sound generator and intake manifold as claimed in claim 20, wherein the sound outlet port of the intake sound generator is connected into the intake manifold at one end of the intake manifold close to those parts of the intake manifold arranged to distribute the combustion mixture to end cylinders of the engine.

* * * * *